United States Patent [19]

Watanabe et al.

[11] Patent Number: 4,732,749

[45] Date of Patent: Mar. 22, 1988

[54] METHOD OF MANUFACTURING LONGER FIBERS OF POTASSIUM TITANATE

[75] Inventors: Akira Watanabe; Yoshimitsu Takeuchi; Gouji Saeki; Megumu Shimomi, all of Okayama, Japan

[73] Assignee: Kyushu Refractories Co., Ltd., Bizen, Japan

[21] Appl. No.: 819,859

[22] Filed: Jan. 17, 1986

[30] Foreign Application Priority Data

Jan. 18, 1985 [JP] Japan .................................. 60-8245

[51] Int. Cl.$^4$ .............................................. C01G 23/00
[52] U.S. Cl. .................................... 423/598; 423/608
[58] Field of Search .................. 423/598, 608, 69, 179

[56] References Cited

U.S. PATENT DOCUMENTS

| 3,952,090 | 4/1976 | Shimizu et al. | 423/598 |
| 4,041,143 | 8/1977 | Fujiki et al. | 423/598 |
| 4,179,496 | 12/1979 | Yanagida et al. | 423/598 |
| 4,265,872 | 5/1981 | Fujiki | 423/598 |
| 4,390,513 | 6/1983 | Fujiki | 423/598 |

FOREIGN PATENT DOCUMENTS 0030724 2/1984 Japan .................................. 423/598

Primary Examiner—Robert L. Stoll
Attorney, Agent, or Firm—Cushman, Darby & Cushman

[57] ABSTRACT

Long potassium titanate fibers (100–3000 μm) made by heat reaction in gas permeable calcination vessel, made of material containing at least 25 wt %, preferably at least 50 wt %, MgO to prevent plugging of the vessel during the reaction and maintain gas permeation.

3 Claims, No Drawings

METHOD OF MANUFACTURING LONGER FIBERS OF POTASSIUM TITANATE

BACKGROUND OF THE INVENTION

The present invention relates to a method of manufacturing potassium titanate fibers which are used as a composite filler material for plastics and metals, a filter material, as a membrane or in electronic appliances. More particularly, it relates to a method for manufacturing longer fibers of potassium titanate or derivatives of potassium titanate.

PRIOR DEVELOPMENT

Various methods for manufacturing potassium titanate fibers have been developed including the fusion process of reacting a mixture of raw materials by heating and fusing; the flux process of adding a flux to the mixture during heating and fusing; the calcination process of reacting the raw material at a temperature lower than the fusing point; and the method of calcination in which the temperature is controlled. These processes, however, are all defective in the fibers having only a short length of 100 $\mu m$ or less result.

Because of the short length, potassium titanate fibers do not fully display their excellent features and the fiber length and this has limited their application.

Indeed longer lengths are advantageous, for example, when potassium titanate fibers are added as reinforcing materials to composite plastics since interlocking of these longer fibers is accelerated to achieve a higher reinforcing effect with a smaller amount of fiber addition.

In the conventional calcination method of manufacturing potassium titanate fibers, the mixing ratio of the raw material titanium-containing compound and the potassium-containing compound is set such that the potassium-containing compound is slightly in excess than in the titanium and potassium ratio in the resultant product. In such a condition, a portion of $K_2O$ evaporates the reaction of the above process and accelerates the fiber growth. The evaporation speed of $K_2O$ should not be too fast or too slow in order to obtain the longer fibers.

Since open state calcination for manufacturing potassium titanate fibers may cause excessive evaporation of $K_2O$, there is a process using a vessel with a comparatively small opening. A sintering vessel of this type made of a porous material with adequate permeation to promote adequate evaporation and diffusion of $K_2O$, thereby producing a comparatively longer fiber length product.

Conventional vessels are made primarily of alumina-silica materials. However, such calcination vessels react with its component, $K_2O$, at about 700° C. and forms $K_2O \cdot 4SiO$ (potassium tetrasilicate) or $K_2O \cdot Al_2O_3 \cdot 6SiO$ (potash feldspar) to coat the inside surface of the alumina-silica vessel to thereby prevent gas permeation. This increases the $K_2O$ vapor pressure inside the container also serves to restrain fiber growth.

DETAILED DESCRIPTION OF THE INVENTION

The inventors of the present invention have found that potassium titanate fiber length can be extended using a calcination vessel such as a saggar or crucible in the calcination method, the vessel made of a material containing 25 wt % or more MgO. The calcination method is for industrial production among those described above, and completed the present invention.

Since the MgO component in the material forming the vessel is not only non-reactant to $K_2O$ but also reduces or eliminates any reaction of the material with $K_2O$, plugging of the micro pores is prevented. During the generation of potassium titanate, $K_2O$ is diffused and discharged outside the container through open pores. As a result, the $K_2O$ vapor pressure inside the vessel does not increase, nor is $K_2O$ evaporation restrained and as a result fiber growth is promoted to produce longer fibers.

As described in the above, the present invention is characterized in that the calcination vessel material contains 25 wt % or more of MgO present, for example, as magnesia dolomite or chrome-magnesite added at the time of the vessel is made. With less than 25 wt % of MgO, the reaction with other compounds, particularly of $SiO_2$ and $K_2O$, cannot be restrained and plugging of the micro pores occurs, so that the desired effect to the MgO addition is not demonstrable.

If a basic material such as magnesia, dolomite or chrome-magnesite is used mainly for manufacturing the calcination vessel, a particularly preferable result is achieved since the MgO content will exceed 50 wt % and $SiO_2$ content, which is an impurity, will be reduced. If the MgO content is at least 25 wt %, if not as much as 50 wt %, MgO will react with $SiO_2$ to form compounds such as $2 MgO \cdot SiO_2$ (Forsterite) and decrease any possible reaction with $K_2O$. Thus, the present inventors confirmed that $K_2O$ diffusion through micro pores of the container is not particularly hampered. Although there is no particular restriction on the composition of the calcination vessel other than the MgO component, several experiments indicate that the $SiO_2$ content should preferably be at most 25 wt %.

The method of manufacturing potassium titanate fibers according to the calcination method using the basic calcination vessel of the present invention is now explained.

One or more materials selected from the group consisting of potassium carbonate, potassium hydrogen carbonate, potassium hydroxide, potassium sulfate, potassium nitrate, potassium chloride, potassium bromide, potassium and of fluoride, titanium dioxide and titanium hydroxide are weighed and mixed together to achieve the molecular ratio of 1 : 1 to 8, preferably 1 : 1 to 5, for $K_2O$ and $TiO_2$, to the resultant mixture water is added and is kneaded to prepare a paste or is compression molded, and then heated at 900° C–1250° C. for 30 minutes to 1000 hours, preferably for 20 hours to 50 hours.

Fibers of potassium titanate thus prepared are dipped into water, disentangled and then removed.

By further treating these fibers with an acid solution, potassium titanate or oxide fibers with a different $K_2O/TiO_2$ ratio may be obtained, or by treating them in an alkaline aqueous solution with an alkaline earth metal compound, fibers of various titanium compounds, such as titanate alkaline earth metals, may be obtained.

The present invention enables the industrial scale manufacture of potassium titanate fibers with a length of 0.1–5 mm.

EXAMPLE

TABLE 1

| No. | Saggar Material | Chemical composition (wt %) | | | | | | | Apparent porosity (%) | Apparent density | Bulk density | Compression strength (kg/cm$^2$) |
|---|---|---|---|---|---|---|---|---|---|---|---|---|
| | | SiO$_2$ | Al$_2$O$_3$ | Fe$_2$O$_3$ | CaO | MgO | Cr$_2$O$_3$ | TiO$_2$ | | | | |
| 1 | Magnesia | 0.3 | 0.2 | 0.1 | 0.8 | 98.6 | — | — | 17.3 | 3.51 | 2.90 | 500 |
| 2 | Dolomite | 1.5 | 0.4 | 0.8 | 20.0 | 77.3 | — | — | 16.8 | 3.50 | 2.91 | 550 |
| 3 | Chrome-magnesite | 0.8 | 12.9 | 3.9 | 0.7 | 71.1 | 10.6 | — | 16.3 | 3.67 | 3.07 | 600 |
| 4 | Spinel | 0.2 | 71.0 | 0.2 | 0.4 | 28.0 | — | — | 17.5 | 3.48 | 2.87 | 500 |
| 5 | Magnesia-alumina-silica | 24.8 | 34.5 | 1.6 | 0.7 | 37.2 | — | 0.6 | 18.5 | 3.01 | 2.45 | 400 |
| 6 | Alumina-silica | 31.2 | 64.7 | 1.6 | 0.2 | 0.3 | — | 1.3 | 18.0 | 3.05 | 2.50 | 500 |

TABLE 2

| | Examples | | | | | | | | Comparative Examples | | | |
|---|---|---|---|---|---|---|---|---|---|---|---|---|
| | 1 | 2 | 3 | 4 | 5 | 6 | 7 | 8 | 1 | 2 | 3 | 4 |
| Potassium carbonate (kg) | 253 | 146 | 146 | 146 | 146 | 146 | 146 | 102 | 253 | 146 | 102 | 146 |
| Titanium dioxide (kg) | 147 | 254 | 254 | 254 | 254 | 254 | 254 | 298 | 147 | 254 | 298 | 254 |
| K$_2$O/TiO$_2$ (mol ratio) | 1/1 | 1/3 | 1/3 | 1/3 | 1/3 | 1/3 | 1/3 | 1/5 | 1/1 | 1/3 | 1/5 | 1/3 |
| Annealing temperature (°C.) | 1000 | 1000 | 1100 | 1100 | 1100 | 1100 | 1100 | 1100 | 1000 | 1000 | 1000 | 1100 |
| Saggar material No (Table 1) | 1 | 1 | 1 | 2 | 3 | 4 | 5 | 1 | 6 | 6 | 6 | 6 |
| Fiber length (μm) | 100–300 | 100–500 | 300–3000 | 300–2500 | 300–2000 | 100–500 | 100–300 | 100–300 | 20–30 | 20–50 | 20–25 | 20–80 |
| Fiber diameter (μm) | 3–10 | 3–20 | 10–40 | 10–40 | 10–35 | 3–20 | 3–15 | 4–10 | 0.8–1 | 0.8–1.5 | 0.8–1 | 1–2 |
| Fiber/length diameter | 30–33 | 25–33 | 30–75 | 30–62 | 30–57 | 25–33 | 15–33 | 25–30 | 25–30 | 25–33 | 25–28 | 25–33 |
| Reaction product | K4T | K4T K6T | K4T K6T | K4T K6T | K4T K6T | K4T K6T | K4T K6T | K6T | K4T | K4T | K6T | K4T |

Note:
K4T: K$_2$O.4TiO$_2$
K6T: K$_2$O.6TiO$_2$

Table 1 shows the chemical composition and physical properties of the calcination vessel of the present invention.

To potassium carbonate and titanium dioxide in the amounts as shown in Table 2 were added 13 wt. parts water to 100 parts dry mixture and the resultant mixture was compression molded into a shape of 230×115×65 mm, which was placed in a calcination vessel and then heated for 50 hours at the temperatures shown in Table 2. After cooling, the product was dipped into water. The size of fibers taken out are reported in Table 2.

As is apparent from the results in Table 2, potassium titanate fibers of the Examples which were heated in the calcination vessel containing 25 wt % or more of MgO had much a longer fiber length compared to those obtained in Comparative Examples, thereby proving the superiority of the present invention method.

What is claimed:
1. A method of manufacturing potassium titanate fibers comprising:
   (a) placing a mixture of titanium- and potassium-containing compounds in a gas-permeable calcination vessel; and
   (b) heat reacting said mixture;
wherein said vessel comprises at least 25 wt. % MgO.
2. The method according to claim 1 wherein the calcination vessel comprises at least 50 wt. % MgO.
3. The method according to claim 2 wherein the calcination vessel further comprises 25 wt. % SiO$_2$ or less.

* * * * *